(12) United States Patent
Fickeisen et al.

(10) Patent No.: US 7,112,626 B1
(45) Date of Patent: *Sep. 26, 2006

(54) POLYMER COMPOSITION FOR USE AS AQUEOUS FLOOR ADHESIVE

(75) Inventors: Peter Fickeisen, Dirmstein (DE); Martin Meister, Neustadt (DE); Bernd Reck, Grünstadt (DE); Dieter Urban, Speyer (DE); Eckehardt Wistuba, Bad Dürkheim (DE); Thomas Koch, Waldsee (DE); Georg Langhauser, Ruppertsberg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/582,216

(22) PCT Filed: Dec. 18, 1998

(86) PCT No.: PCT/EP98/08418

§ 371 (c)(1),
(2), (4) Date: Jul. 20, 2000

(87) PCT Pub. No.: WO99/37716

PCT Pub. Date: Jul. 29, 1999

(30) Foreign Application Priority Data

Jan. 20, 1998 (DE) .............. 198 01 892

(51) Int. Cl.
| C08L 33/08 | (2006.01) |
| C08L 33/10 | (2006.01) |
| C08K 3/26 | (2006.01) |
| C08K 3/34 | (2006.01) |
| C09J 133/08 | (2006.01) |

(52) U.S. Cl. .............. 524/560; 524/425; 524/493; 524/914; 524/915; 156/304.7; 156/332

(58) Field of Classification Search ............... 524/560, 524/572, 556, 425, 493, 914, 915; 156/327, 156/332, 304.7
See application file for complete search history.

(56) References Cited

U.S. PATENT DOCUMENTS

| 4,225,496 | A | * | 9/1980 | Columbus et al. .......... 524/425 |
| 4,626,567 | A | * | 12/1986 | Chang ....................... 524/493 |
| 4,654,388 | A | * | 3/1987 | Lofgren ..................... 524/272 |
| 4,966,829 | A | * | 10/1990 | Yasuda et al. .............. 430/109 |
| 4,972,000 | A | * | 11/1990 | Kawashima et al. ......... 524/54 |
| 5,196,468 | A | | 3/1993 | Schwerzel et al. |
| 5,637,644 | A | * | 6/1997 | Tsuruoka et al. ........... 524/828 |
| 5,639,811 | A | * | 6/1997 | Plamthottam et al. ...... 524/272 |
| 6,124,417 | A | * | 9/2000 | Su .......................... 526/318.44 |
| 6,409,860 | B1 | * | 6/2002 | Fickeisen et al. .............. 156/71 |

FOREIGN PATENT DOCUMENTS

| CA | 2182743 | * | 2/1995 |
| EP | 0 490 191 | | 6/1992 |
| EP | 792926 | * | 9/1997 |
| JP | 63270872 | * | 11/1988 |
| JP | 07173798 | * | 7/1995 |
| WO | WO 95/21884 | | 8/1995 |

* cited by examiner

Primary Examiner—Callie Shosho
(74) Attorney, Agent, or Firm—Oblon, Spivak, McCelland, Maier & Neustadt, P.C.

(57) ABSTRACT

An aqueous composition comprises a mixture of
from 10 to 50% by weight of a polymer A) having a gel content of less than 40% by weight and a number-average molecular weight $M_n$ of the soluble fractions of less than 30,000 and
from 50 to 90% by weight of a filler B), the amounts by weight being based on the weight sum of the polymer and of the filler.

40 Claims, No Drawings

POLYMER COMPOSITION FOR USE AS AQUEOUS FLOOR ADHESIVE

The present invention relates to an aqueous composition comprising a mixture of from 10 to 50% by weight of a polymer A) having a gel content of less than 40% by weight and a number-average molecular weight $M_n$ of the soluble fractions of less than 30,000 and from 50 to 90% by weight of a filler B), the amounts by weight being based on the weight sum of the polymer A) and of the filler B).

The invention additionally relates to the use of this aqueous composition as an adhesive for floor coverings.

Adhesives are generally required to display good adhesion—in other words, to stick well to the substrate—and good cohesion—in other words, to hold together well within the adhesive layer. Adhesives for floor coverings are subject to particular requirements. Here, there is a desire in particular for good wet bonding capacity. A good wet bonding capacity means that after a carpet, for example, has been laid on the substrate which is coated with the aqueous dispersion the carpet can initially still be aligned and its position corrected, but that soon after a slipproof bond develops whose strength increases as drying progresses.

A good dry bonding capacity means that even after a prolonged period of ventilation a carpet, after having been laid on the substrate, which is then dry, gives a firm, slipproof bond.

A further desire is to dispense with volatile organic constituents, such as solvents or plasticizers, in order to avoid subsequent exposure to corresponding emissions.

A low binder content is also desirable. When tackifiers are added, the level of properties should remain as good as possible—especially the cohesion.

Flooring adhesives are already known from EP-A-490191 and WO 95/21884.

It is an object of the present invention to provide flooring adhesives having improved performance properties, in particular a good wet bonding capacity.

A further object is to keep the binder content in the flooring adhesives as low as possible on cost grounds. Where the addition of tackifiers (tackifying resins) is desired, this should be possible without adverse effect on, for example, wet and dry bonding capacity.

We have found that these objects are achieved by the aqueous composition described above and by its use as a flooring adhesive.

The aqueous composition comprises preferably from 10 to 45% by weight, with particular preference from 15 to 40% by weight, of the polymer A) defined at the outset, and from 55 to 90% by weight, with particular preference from 60 to 85% by weight, of a filler B).

The percentages by weight are based in each case on the weight sum of A) and B).

The polymer A) is preferably a free-radically polymerized polymer of ethylenically unsaturated monomers.

The polymer preferably comprises principal monomers selected from $C_1$–$C_{20}$-alkyl (meth)acrylates, vinyl esters of carboxylic acids having up to 20 carbons, vinylaromatic compounds having up to 20 carbon atoms, ethylenically unsaturated nitriles, vinyl halides, nonaromatic hydrocarbons having at least 2 conjugated double bonds, or mixtures of these monomers.

The abovementioned monomers and mixtures thereof are preferably present in the polymer to an extent of from 60 to 100% by weight, preferably from 80 to 100% by weight and, with particular preference, from 90 to 99.8% by weight, based on the polymer.

Mention may be made specifically, for example, of $C_1$–$C_{10}$-alkyl (meth)acrylates, such as methyl methacrylate, methyl acrylate, n-butyl acrylate, ethyl acrylate and 2-ethylhexyl acrylate.

Mixtures of the (meth)acrylic alkyl esters are also particularly suitable.

Examples of vinyl esters of carboxylic acids having 1 to 20 carbon atoms are vinyl laurate, vinyl stearate, vinyl propionate, Versatic acid vinyl ester and vinyl acetate.

Suitable vinylaromatic compounds are vinyltoluene, α- and p-methylstyrene, α-butylstyrene, 4-n-butylstyrene, 4-n-decyl-styrene and, preferably, styrene. Examples of nitriles are acrylonitrile and methacrylonitrile.

The vinyl halides are ethylenically unsaturated compounds substituted by chlorine, fluorine or bromine, preferably vinyl chloride and vinylidene chloride.

As nonaromatic hydrocarbons having 2 to 8 carbon atoms and at least two olefinic double bonds there may be mentioned butadiene, isoprene and chloroprene.

Particular preference is given to (meth)acrylic esters and mixtures thereof.

Further monomers, which may be present in the polymer to the extent, for example, of from 0 to 40% by weight, preferably from 0 to 20% by weight and, with particular preference, from 0.2 to 10% by weight, are, in particular, $C_1$–$C_{10}$-hydroxyalkyl (meth)acrylates, (meth)acrylamide and its N—$C_1$–$C_4$-alkyl-substituted derivatives, ethylenically unsaturated carboxylic acids, dicarboxylic acids, their monoesters and anhydrides, examples being (meth)acrylic acid, maleic acid, fumaric acid, maleic anhydride, maleic and fumaric monoesters and itaconic acid. Very particular preference is given to a content of from 0.2 to 5% by weight of an ethylenically unsaturated carboxylic acid.

The glass transition temperature of the polymer is preferably from −50 to +20° C., in particular from −35° C. to +20° C., with particular preference from −30° C. to 0° C. and, with very particular preference, from −28° C. to −5° C.

The glass transition temperature of the polymer can be determined by customary methods such as differential thermoanalysis or differential scanning calorimetry (see e.g. ASTM 3418/82, midpoint temperature).

The gel content of the polymer A) is below 40% by weight, preferably below 30% by weight and, with particular preference, below 20% by weight, based on the polymer A). The gel content should preferably be more than 5% by weight.

The gel content is the content of insoluble constituents. It is defined and determined by the following method: the dispersion is dried at 21° C. to give a film approximately 1 mm thick. One gram of the polymer film is added to 100 ml of tetrahydrofuran and is allowed to stand at 21° C. for a week. Thereafter, the resulting solution or mixture is filtered with the aid of a cloth filter (mesh size 125 μm). The residue (swollen film) is dried at 21° C. for 2 days in a vacuum drying cabinet and then weighed. The gel content is the mass of the weighed residue, divided by the mass of the polymer film employed.

The tetrahydrofuran-soluble fractions of the polymer are, correspondingly, from 60 to 100% by weight, preferably from 70 to 100% by weight, with particular preference from 80 to 100% by weight and, in particular, up to 95% by weight, based on the polymer.

The number-average molecular weight $M_n$ of these soluble fractions is preferably less than 20,000, preferably less than 15,000, and the weight-average molecular weight $M_w$ is preferably greater than 250,000 (as determined by gel permeation chromatography with polystyrene as standard on a polymer solution in tetrahydrofuran following sedimentation of the insoluble constituents).

Generally, however, $M_n$ is not less than 5000 g/mol and $M_w$ is not more than 800,000 g/mol.

The polymer is prepared by free-radical polymerization. Suitable methods of polymerization, such as bulk, solution, suspension or emulsion polymerization, are known to the skilled worker.

The copolymer is preferably prepared by solution polymerization with subsequent dispersion in water or, with particular preference, by emulsion polymerization, to give aqueous copolymer dispersions.

An emulsion polymerization can be conducted batchwise, with or without the use of seed latices, with all or some constituents of the reaction mixture being included in the initial charge, or, preferably, with some being included in the initial charge and the remainder of all or some constituents of the reaction mixture being metered in subsequently, or else in accordance with the metering technique without an initial charge.

In emulsion polymerization, the monomers can as usual be polymerized in the presence of a water-soluble initiator and an emulsifier at preferably from 30 to 95° C.

Examples of suitable initiators are sodium, potassium and ammonium persulfate, tert-butyl hydroperoxides, water-soluble azo compounds, or redox initiators, such as $H_2O_2$/ascorbic acid.

Examples of the emulsifiers used are alkali metal salts of relatively long-chain fatty acids, alkyl sulfates, alkyl-sulfonates, alkylated arylsulfonates or alkylated biphenyl ether sulfonates. Further suitable emulsifiers are reaction products of alkylene oxides, especially ethylene or propylene oxide, with fatty alcohols, fatty acids or phenol, or else with alkylphenols.

In the case of aqueous secondary dispersions the copolymer is first of all prepared by solution polymerization in an organic solvent and then is dispersed in water without using an emulsifier or dispersing auxiliary but with addition of salt-forming agents, for example ammonia for carboxyl-containing copolymers. The organic solvent can be removed by distillation. The preparation of aqueous secondary dispersions is known to the skilled worker and is described, for example, in DE-A-37 20 860.

In the course of polymerization it is possible to employ regulators to adjust the molecular weight. Suitable examples are SH-containing compounds, such as mercaptoethanol, mercapto-propanol, thiophenol, thioglycerol, ethyl thiogly-colate, methyl thioglycolate and tert-dodecyl mercaptan.

The solids content of the resulting polymer dispersions is preferably from 40 to 80% and, with particular preference, from 45 to 75% by weight. High polymer solids contents can be established, for example, by techniques which are described in the German Patent Application P 4 307 683.1 or in EP 37 923.

In addition to the polymer the aqueous composition comprises at least the filler B). Examples of suitable such fillers are finely ground or precipitated chalks having an average particle diameter of in general from 2 to 50 µm, and/or quartz flour having a customary average particle diameter of from 3 to 50 µm.

The composition may also include wetting agents or dispersants for the fillers, for example; thickeners, and also, for example, further customary additives, such as defoamers and preservatives.

Wetting or dispersing agents can be present in the aqueous composition in amounts, for example, of from 0 to 5% by weight, thickeners in amounts from 0 to 10% by weight, preservatives in amounts from 0 to 1% by weight and defoamers in amounts from 0 to 5% by weight. These amounts by weight relate to the sum of all constituents of the aqueous composition with the exception of the water.

The composition is preferably essentially free and with particular preference totally free from organic solvents and plasticizers such as butyl acetate, toluene or phthalates, for example. It therefore comprises organic compounds having a boiling point below 300° C. at atmospheric pressure (1 bar) in amounts of less than preferably 0.5% by weight, with particular preference less than 0.1% by weight and, with very particular preference, less than 0.05% by weight, and in particular less than 0.01% by weight. It is particularly preferred for the composition of the invention or the flooring adhesive of the invention to meet the requirements of freedom from emissions as defined by GEV [German Association for Controlled Emission Installation materials].

The emissions are determined by a chamber test method. The flooring adhesive or composition of the invention is applied at a rate of 300 g/m² to a glass plate whose size depends on the volume of the chamber. The chamber is loaded with 0.4 m² of the coated glass plate per m³ of chamber volume. The emission conditions in the stainless steel testing chamber (volume at least 125 liters) are 23° C., 50% relative atmospheric humidity and an hourly air-change regime which brings about total exchange of the air every 2 hours. The long-term emissions are determined after 10 days. For this purpose, a defined volume of the airstream is passed over adsorbents. Following desorption, the emitted substances are determined by gas (GC-MS coupling) or liquid chromatography. The long-term emissions are determined in µg/m³, using toluene as standard substance. Emitted substances whose chamber concentration is greater than 20 µg/m³ are identified, and with the pure substance identified and calibrated [sic]. Emitted substances whose chamber concentration is less than 20 µg/m³ are not identified individually. In such cases, calibration take place with toluene.

The values for all the substances are added up.

In the case of the composition of the invention, the emission value for the sum of all organic compounds is not more than preferably 1500 µg/m³ and in particular not more than 500 µg/m³.

The composition can comprise tackifying resins (tackifiers), such as rosins or modified rosins, based, for example, on hydrogenated abietic acid or abietic esters.

The content of tackifiers can preferably be from 1 to 40 parts by weight, based on 100 parts by weight of the sum of polymer A) and filler B).

The aqueous composition can be prepared in a simple manner by adding the fillers and any further additives with stirring to the aqueous polymer dispersion resulting from the emulsion polymerization.

The water content of the finished formulation is generally from 7 to 50, in particular from 10 to 30% by weight, based on the overall aqueous formulation.

The aqueous composition is particularly suitable as an adhesive for bonding substrates made from plastic, wood, metal and textiles formed from woven and/or nonwoven fibers.

The aqueous formulation is particularly suitable as a flooring adhesive for carpets or other floor coverings made, for example, from PVC (in configurations as multilayer coverings or homogeneous coverings), foam coverings with a textile backing (e.g. jute), polyester nonwoven, rubber coverings, textile coverings with, for example, various backings (for instance, polyurethane foam, styrene-butadiene foam, a textile secondary backing), needlefelt floor coverings, polyolefin coverings or linoleum coverings, on substrates such as wood, screeding, concrete, ceramic tiles, metal substrates or the like.

The adhesive can be applied to the substrate using, for example, a toothed applicator. After customary venting, the floor covering is installed. In terms of processing, the adhesive of the invention resembles the solvent-containing synthetic-resin adhesives and the conventional single-side dispersion adhesives. In terms of ease of application, the novel adhesive resembles solvent-containing adhesives. The adhesive composition of the invention features a good level of performance properties such as peel strength, shear strength, wet bonding capacity and dry gripping capacity. The composition of the invention achieves this good level of properties with a markedly reduced content of binder, i.e. of polymer A). Even following the addition of tackifiers in order, for example, to increase the tackiness, the wet bonding strength remains at a high level.

The parts and percentages indicated in the examples which follow are by weight unless specified otherwise.

EXAMPLES

I. Dispersions

The table below lists a number of commercial products which are recommended for flooring adhesives, for comparison. In its monomer composition, Acronal DS corresponds to Acronal 378 and therefore has the same glass transition temperature ($T_g$). The content of regulator was varied in order to obtain the desired molecular weight.

TABLE 1

Physical data of the dispersions

| Dispersion | SC | $M_n$ | $M_w$ | $M_w/M_n$ | Gel content % by weight | $T_g/°$ C. |
|---|---|---|---|---|---|---|
| Acronal A200 for comparison | 70% | 26,000 | 416,00 [sic] | 16 | 54% | −47 |
| Acronal A323 for comparison | 55% | 5800 | 753,000 | 130 | 70% | −22 |
| Acronal 378 for comparison | 62% | 22,000 | 437,000 | 20 | 68% | −22 |
| Acronal DS | 62% | 11,900 | 354,000 | 30 | 15% | −22 |

SC: Solids content
$T_g$: Glass transition temperature

II. Flooring Adhesives

The dispersions were mixed with filler and with further additives.

Table 2 sets out the co-components and their proportions by weight.

TABLE 2

| Experiment | 1 | 2 | 3 | 4 |
|---|---|---|---|---|
| Acronal A 200 | 24.4 | | | |
| Acronal A 323 | | 31.0 | | |
| Acronal DS 378 | | | 27.5 | |
| Acronal DS | | | | 27.5 |

TABLE 2-continued

| Experiment | 1 | 2 | 3 | 4 |
|---|---|---|---|---|
| 2% strength Latekoll D solution[1] | 14.6 | 8.0 | 11.5 | 11.5 |
| Agitan 281[2] | 0.2 | 0.2 | 0.2 | 0.2 |
| Lutensol AO 109[3] | 0.5 | 0.5 | 0.5 | 0.5 |
| Lumiten N-OG[4] | 0.5 | 0.5 | 0.5 | 0.5 |
| Pigmentverteiler NL[5] | 0.5 | 0.5 | 0.5 | 0.5 |
| Calgon N 30%[6] | 1.0 | 1.0 | 1.0 | 1.0 |
| Sodium gluconate[7] | 1.5 | 1.5 | 1.5 | 1.5 |
| Burez LE 3004[8] | 11.0 | 11.0 | 11.0 | 11.0 |
| Ulmer Weiss XM[9] | 45.8 | 45.8 | 45.8 | 45.8 |

The amount of the polymer dispersion was determined so as to give in each case 17 parts by weight of polymer (solids).
The amount of thickener (Latekoll) was determined so that the viscosity was equal.
[1] Thickener
[2] Defoamer
[3] Emulsifier
[4] Emulsifier
[5] Dispersant for pigment
[6] Dispersant for pigment
[7] —
[8] Tackifier (resin based on the triethylene glycol ester of abietic acid)
[9] Filler III. Performance Testing Wet bonding capacity (WBC):
The adhesive is applied with a DIN blade to a cement fiberboard panel (e.g. Eternit® 2000; 20×50 cm) in the direction of takeoff. The amount applied is about 350–400 g/m². Needlefelt floor covering strips are placed in the bed of adhesive following a venting period of 10 minutes and are pressed on with a 2.5 kg roller by rolling backward and forward 3 times. At the stated intervals of time, the strips are pulled off with a takeoff apparatus, during which the increase in the peel resistance is determined in N 5 cm.

The results are set out in Table 3.

Peel strength: determined in accordance with DIN 53269

TABLE 3

| | Peel values N/mm | | WBC N/5 cm | | | |
|---|---|---|---|---|---|---|
| | 10 min | 30 min | 10 min | 15 min | 20 min | 30 min |
| 1 (for comparison) | 0.34 | 0.24 | 4 | 7 | 9 | 8 |
| 2 (for comparison) | 0.91 | 0.07 | 2 | 5 | 11 | 22 |
| 3 (for comparison) | 1.38 | 0.18 | 4 | 10 | 19 | 34 |
| 4 | 1.22 | 0.24 | 12 | 26 | 44 | 49 |

We claim:
1. A method of adhering a floor covering, comprising:
applying an aqueous composition to said floor covering; and
installing the floor covering,
wherein said aqueous composition comprises:
A) 10 to 50% by weight of a polymer having a gel content of 5 to 40% by weight and a number-average molecular weight, Mn, of a tetrahydrofuran-soluble fraction of less than 30,000, where said polymer comprises from 60 to 100% by weight of a $C_1$- to $C_{20}$-alkyl (meth)acrylate or mixture of at least two $C_1$- to $C_{20}$-alkyl (meth)acrylates, based on a total weight of said polymer, and
B) 50 to 90% by weight of a filler;

wherein the amount of said polymer and the amount of said filler are based on the weight sum of the polymer and of the filler;

wherein said filler is selected from the group consisting of a chalk having an average particle diameter of from 2 to 50 µm, a quartz flour having an average particle diameter of from 3 to 50 µm and a combination thereof; and wherein said polymer optionally further comprises a monomer unit selected from the group consisting of a $C_1$–$C_{10}$-hydroxyalkyl (meth)acrylate, a (meth)acrylamide and its N—$C_1$–$C_4$-alkyl-substituted derivative, an ethylenically unsaturated carboxylic acid, a dicarboxylic acid, a monoester of a dicarboxylic acid and an anhydride of a dicarboxylic acid.

2. The method as claimed in claim 1, wherein said $C_1$- to $C_{20}$-alkyl (meth)acrylate is present in an amount of from 80 to 100% by weight in said polymer.

3. The method as claimed in claim 1, wherein said $C_1$- to $C_{20}$-alkyl (meth)acrylate is present in an amount of from 90 to 99.8% by weight in said polymer.

4. The method as claimed in claim 1, wherein said aqueous composition has 10 to 45% by weight of said polymer and 55 to 90% by weight of said filler.

5. The method as claimed in claim 1, wherein said aqueous composition has 60 to 85% by weight of said filler.

6. The method as claimed in claim 1, wherein said polymer comprises at least one monomer unit selected from the group consisting of a $C_1$–$C_{20}$-alkyl (meth)acrylate, a vinyl ester of a carboxylic acid having up to 20 carbon atoms, a vinylaromatic compound having up to 20 carbon atoms, an ethylenically unsaturated nitrile, a vinyl halide and a nonaromatic hydrocarbon having at least 2 conjugated double bonds.

7. The method as claimed in claim 1, wherein said monomer unit is present in said polymer in an amount of from 0 to 40% by weight.

8. The method as claimed in claim 1, wherein said monomer unit is present in said polymer in an amount of from 0 to 20% by weight.

9. The method as claimed in claim 1, wherein said monomer unit is present in said polymer in an amount of from 0.2 to 10% by weight.

10. The method as claimed in claim 1, wherein the gel content of the polymer is more than 5% and less than 20% by weight.

11. The method as claimed in claim 1, where the polymer is present in the form of an aqueous dispersion with a concentration of from 40 to 75%.

12. The method as claimed in claim 1, where a content of a volatile organic compound having a boiling point at 1 bar of less than 300° C. is less than 0.5% by weight, based on said aqueous composition.

13. The method as claimed in claim 1, wherein a glass transition temperature of the polymer is from −50° C. to +20° C.

14. The method as claimed in claim 1, wherein said polymer has a glass transition temperature of from −35 to 20° C.

15. The method as claimed in claim 1, wherein said polymer has a glass transition temperature of from −30 to 0° C.

16. The method as claimed in claim 1, wherein said polymer has a glass transition temperature of from −28 to −5° C.

17. The method as claimed in claim 1, wherein the aqueous composition further comprises at least one component selected from the group consisting of a wetting agent, a dispersant, a defoamer and a preservative.

18. The method of claim 1, wherein said floor covering is selected from the group consisting of a carpet made of polyvinyl chloride, a floor covering made of polyvinyl chloride, a foam covering with a textile backing, a polyester nonwoven, a rubber covering, a textile covering with a backing of polyurethane foam, styrene-butadiene foam, or a secondary textile backing, a needlefelt floor covering, a polyolefin covering, and a linoleum covering.

19. A method of bonding a substrate, comprising:
applying an aqueous composition to said substrate; and
bonding the substrate to a floor covering,
wherein said aqueous composition comprises:
A) 10 to 50% by weight of a polymer having a gel content of 5 to 40% by weight and a number-average molecular weight, Mn, of a tetrahydrofuran-soluble fraction of less than 30,000, where said polymer comprises from 60 to 100% by weight of a $C_1$- to $C_{20}$-alkyl (meth)acrylate or mixture of at least two $C_1$- to $C_{20}$-alkyl (meth)acrylates, based on a total weight of said polymer, and
B) 50 to 90% by weight of a filler;
wherein the amount of said polymer and the amount of said filler are based on the weight sum of the polymer and of the filler;
wherein said filler is selected from the group consisting of a chalk having an average particle diameter of from 2 to 50 µm, a quartz flour having an average particle diameter of from 3 to 50 µm and a combination thereof; and
wherein said polymer further comprises a monomer unit selected from the group consisting of a $C_1$–$C_{10}$-hydroxyalkyl (meth)acrylate, a (meth)acrylamide and its N—$C_1$–$C_4$-alkyl-substituted derivative, an ethylenically unsaturated carboxylic acid, a dicarboxylic acid, a monoester of a dicarboxylic acid and an anhydride of a dicarboxylic acid.

20. The method of claim 19, wherein said substrate is selected from the group consisting of wood, concrete, a ceramic tile, and a metal substrate.

21. A method of adhering a floor covering, comprising:
applying an aqueous composition to said floor covering; and
installing the floor covering,
wherein said aqueous composition comprises:
A) 10 to 50% by weight of a polymer having a gel content of 5 to 40% by weight and a number-average molecular weight, Mn, of a tetrahydrofuran-soluble fraction of less than 30,000, where said polymer comprises from 60 to 100% by weight of a $C_1$- to $C_{20}$-alkyl (meth)acrylate or mixture of at least two $C_1$- to $C_{20}$-alkyl (meth)acrylates, based on a total weight of said polymer, and
B) 50 to 90% by weight of a filler;
wherein the amount of said polymer and the amount of said filler are based on the weight sum of the polymer and of the filler;
wherein said filler is selected from the group consisting of a chalk having an average particle diameter of from 2 to 50 µm, a quartz flour having an average particle diameter of from 3 to 50 µm and a combination thereof; and
wherein a content of a volatile organic compound having a boiling point at 1 bar of less than 300° C. is less than 0.5% by weight, based on said aqueous composition.

22. The method as claimed in claim 21, wherein said $C_1$- to $C_{20}$-alkyl (meth)acrylate is present in an amount of from 80 to 100% by weight in said polymer.

23. The method as claimed in claim 21, wherein said $C_1$- to $C_{20}$-alkyl (meth)acrylate is present in an amount of from 90 to 99.8% by weight in said polymer.

24. The method as claimed in claim 21, wherein said aqueous composition has 10 to 45% by weight of said polymer and 55 to 90% by weight of said filler.

25. The method as claimed in claim 21, wherein said aqueous composition has 60 to 85% by weight of said filler.

26. The method as claimed in claim 21, wherein said polymer comprises at least one monomer unit selected from the group consisting of a $C_1$–$C_{20}$-alkyl (meth)acrylate, a vinyl ester of a carboxylic acid having up to 20 carbon atoms, a vinylaromatic compound having up to 20 carbon atoms, an ethylenically unsaturated nitrile, a vinyl halide and a nonaromatic hydrocarbon having at least 2 conjugated double bonds.

27. The method as claimed in claim 21, wherein said polymer optionally further comprises a monomer unit selected from the group consisting of a $C_1$–$C_{10}$-hydroxyalkyl (meth)acrylate, a (meth)acrylamide and its N—$C_1$–$C_4$-alkyl-substituted derivative, an ethylenically unsaturated carboxylic acid, a dicarboxylic acid, a monoester of a dicarboxylic acid and an anhydride of a dicarboxylic acid.

28. The method as claimed in claim 27, wherein said monomer unit is present in said polymer in an amount of from 0 to 40% by weight.

29. The method as claimed in claim 27, wherein said monomer unit is present in said polymer in an amount of from 0 to 20% by weight.

30. The method as claimed in claim 27, wherein said monomer unit is present in said polymer in an amount of from 0.2 to 10% by weight.

31. The method as claimed in claim 21, wherein the gel content of said polymer is more than 5% and less than 20% by weight.

32. The method as claimed in claim 21, where the polymer is present in the form of an aqueous dispersion with a concentration of from 40 to 75%.

33. The method as claimed in claim 21, wherein a glass transition temperature of the polymer is from −50° C. to +20° C.

34. The method as claimed in claim 21, wherein said polymer has a glass transition temperature of from −35 to 20° C.

35. The method as claimed in claim 21, wherein said polymer has a glass transition temperature of from −30 to 0° C.

36. The method as claimed in claim 21, wherein said polymer has a glass transition temperature of from −28 to −5° C.

37. The method as claimed in claim 21, wherein the aqueous composition further comprises at least one component selected from the group consisting of a wetting agent, a dispersant, a defoamer and a preservative.

38. The method of claim 21, wherein said floor covering is selected from the group consisting of a carpet made of polyvinyl chloride, a floor covering made of polyvinyl chloride, a foam covering with a textile backing, a polyester nonwoven, a rubber covering, a textile covering with a backing of polyurethane foam, styrene-butadiene foam, or a secondary textile backing, a needlefelt floor covering, a polyolefin covering, and a linoleum covering.

39. A method of bonding a substrate, comprising:
    applying an aqueous composition to said substrate; and
    bonding the substrate to a floor covering,
    wherein said aqueous composition comprises:
    A) 10 to 50% by weight of a polymer having a gel content of 5 to 40% by weight and a number-average molecular weight, Mn, of a tetrahydrofuran-soluble fraction of less than 30,000, where said polymer comprises from 60 to 100% by weight of a $C_1$- to $C_{20}$-alkyl (meth)acrylate or mixture of at least two $C_1$- to $C_{20}$-alkyl (meth)acrylates, based on a total weight of said polymer, and
    B) 50 to 90% by weight of a filler;
    wherein the amount of said polymer and the amount of said filler are based on the weight sum of the polymer and of the filler;
    wherein said filler is selected from the group consisting of a chalk having an average particle diameter of from 2 to 50 μm, a quartz flour having an average particle diameter of from 3 to 50 μm and a combination thereof; and
    wherein a content of a volatile organic compound having a boiling point at 1 bar of less than 300° C. is less than 0.5% by weight, based on said aqueous composition.

40. The method of claim 39, wherein said substrate is selected from the group consisting of wood, concrete, a ceramic tile, and a metal substrate.

* * * * *